Dec. 9, 1941.  H. GAU  2,265,525
AUTOMATIC DIRT EXTRACTOR FOR VEHICLE STEPS
Filed June 4, 1941  2 Sheets-Sheet 1
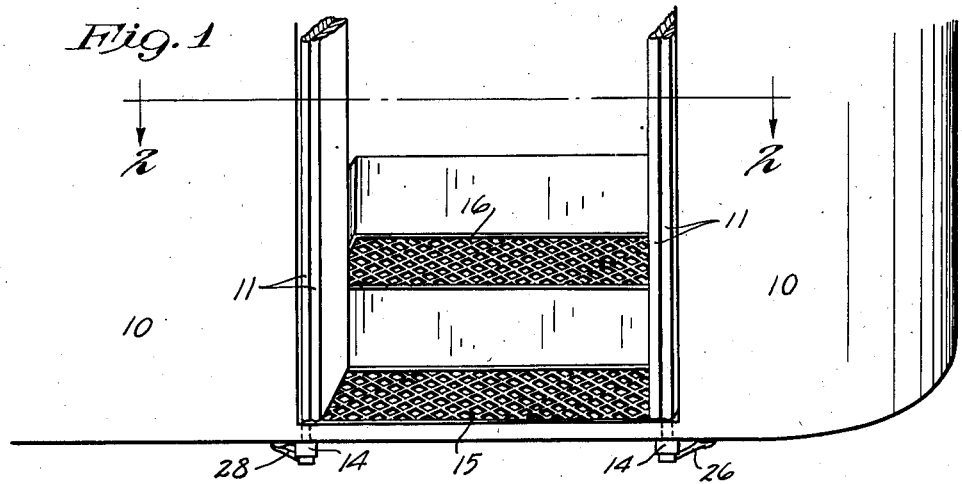
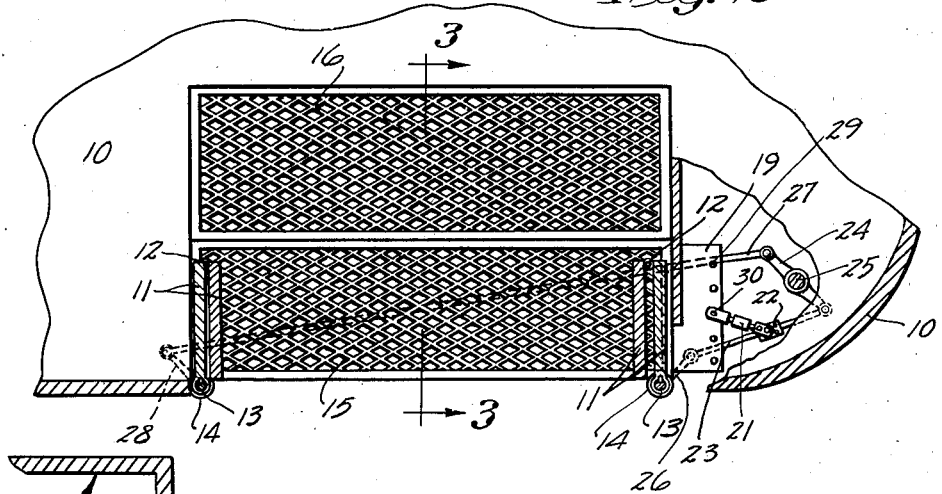
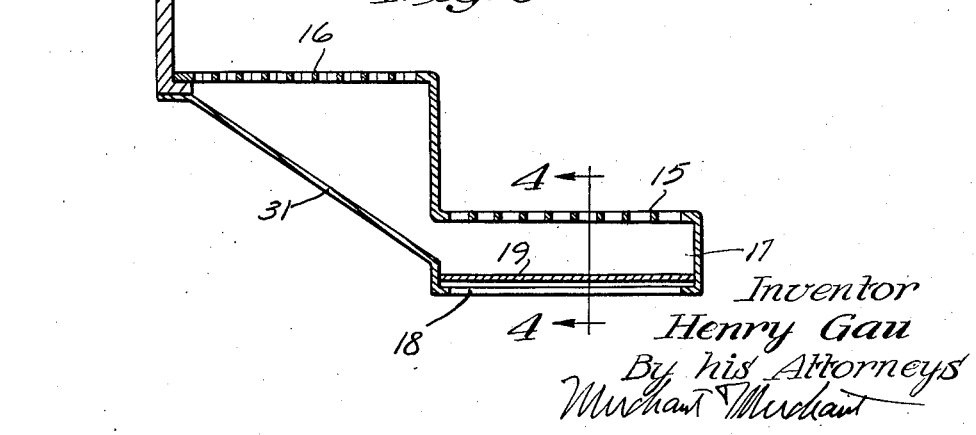
Inventor
Henry Gau
By his Attorneys Patented Dec. 9, 1941

2,265,525

UNITED STATES PATENT OFFICE 2,265,525

AUTOMATIC DIRT EXTRACTOR FOR VEHICLE STEPS

Henry Gau, Pierz, Minn.

Application June 4, 1941, Serial No. 396,599

7 Claims. (Cl. 280—164)

My invention provides a simple and efficient automatic device which, for brevity, is designated as an automatic dirt extractor for vehicle steps; and, generally stated, consists of the novel devices, combinations of devices and arrangement of parts hereinafter described and defined in the claims.

Steps for vehicles such as busses, street cars, and the like, are commonly made in the form of a lattice work or grate which have but very little dirt supporting surface and are of such form that dirt from the feet will readily pass therethrough. When the treads of such steps thus formed are located at the exterior of a closed bus or similar vehicle, the structure just above noted has been found satisfactory. However, in most of the modern, and especially in the lately constructed busses and street cars, these step treads are located inside of the doors, and hence, it is becoming common practice to form such step treads solid so that neither air nor dirt will pass therethrough.

My invention makes it not only possible but feasible to use these lattice work treads on steps that are located inside of the doors of the vehicle. This is made possible by providing, below the treads, a catch box or receptacle, the bottom of which has ample discharge passages, combined with a sliding valve or damper-acting slide formed with discharge passages and intervening scraper-acting portions. These slides are connected to the door or door-actuating mechanism in such a way that when the door is closed, the slide will cut off the passage of air through the dirt box and open tread and when the door is opened, the slide will scrape the dirt from the bottom of the dirt receptacle and cause the same to drop out through coincident openings in the slide and the bottom of the dirt receptacle.

This novel arrangement prevents the cold air from getting into the enclosed body of the vehicle when the door is closed and accomplishes the dirt-discharging or ejecting action when the door is open or while the door is being opened.

This arrangement may be applied to door entrances having one or more steps or treads. So far as this invention is concerned, the door may be a single swinging door or may be a folding sectional door and the connections between the door or door elements and the valve-acting slide may greatly vary since the important thing is that the above indicated movements of the slide or valve-acting element will be moved substantially as indicated simultaneously with or as a result of the opening and closing movement of the door.

The invention is illustrated in the accompanying drawings wherein like characters indicate like parts throughout the several views.

Referring to the drawings:

Fig. 1 is a fragmentary view in perspective, the parts being viewed nearly in elevation showing door steps applied to a bus or the like and to which my invention is applied;

Fig. 2 is a horizontal section taken substantially on the line 2—2 of Fig. 1;

Fig. 3 is a vertical section taken on the line 3—3 of Fig. 2;

Figure 4:
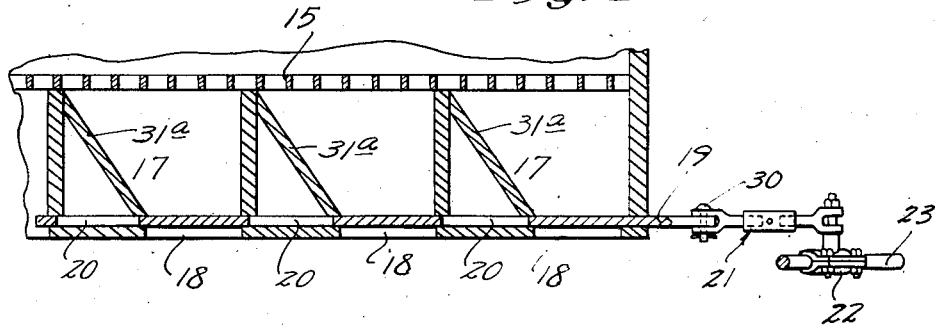
Fig. 4 is a horizontal section taken substantially on the line 4—4 of Fig. 3 showing the valve or scraper-acting slide in a position to cut off the passage of air through the dust receptacle when the door is closed.

In the drawings I have illustrated my invention applied to what may be treated as a commercial bus provided with two steps inside of the doors and I have illustrated the doors as of the four-section folding type. The body of the bus is indicated as an entirety by the numeral 10 and its sectional folding door is indicated by the numeral 11. In this arrangement the folding sections, two at each side, are hingedly connected at 12 and one of the folding sections at each side being secured to an upright shaft 13 rotatively supported in suitable bearings 14 at the sides of the door frame. The grill-like treads 15 and 16 of the two steps are inside of the door and will be within the enclosed portion of the bus when the doors are closed.

Underlying the lower tread 15 is a dust box or receptacle 17 that is provided with a bottom formed with dirt discharge passages 18. Working through the bottom of the box or receptacle 17 and immediately over the bottom thereof is a slide in the form of a plate 19 that has passages 20 preferably about the same size or area as the openings 18. At one end the slide 19 projects and is connected by a link 21 to a head or bracket 22 that is rigidly but adjustably secured on a link 23. This link 23 is connected to one arm of a lever 24, that is rigidly secured on an oscillatory upright shaft 25. One arm of lever 24, by link 23, is connected to an arm 26 on one of the shafts 13 and the other arm of said lever 24, by a relatively long link 27, is connected to an arm 28 of the other or opposite shaft 13. As best shown in Fig. 2, the projecting end of the slide 19 is provided with perforations 29 to any one of which, by a suitable pin or bolt 30, link 21 is adapted to be pivotally attached.

Figure 5:
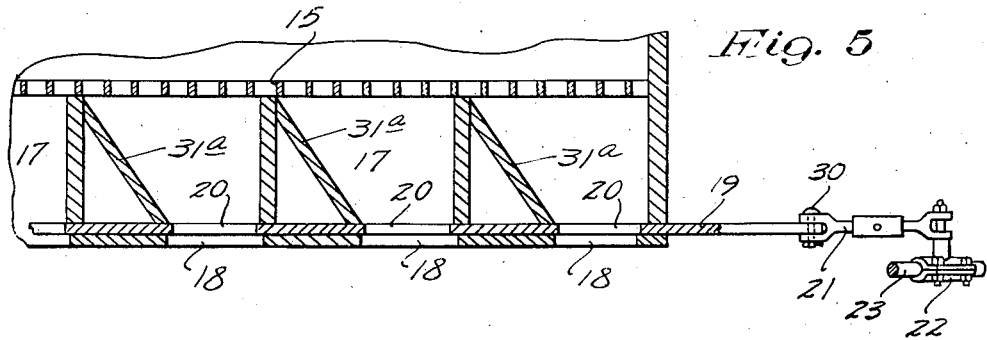
Fig. 5 is a view corresponding to Fig. 4, but showing the slide in the position when the entrance door is open.
Figure 6:
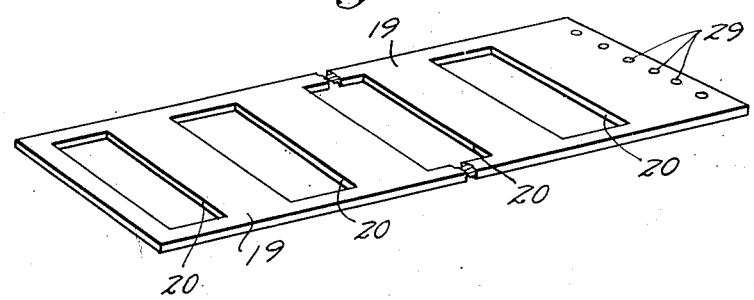
Fig. 6 is a view in perspective showing the so-called valve or scraper-acting slide removed from working position, some parts being broken away.

The upright oscillatory shaft 25 is the shaft of the door opening and closing mechanism. Such a shaft is usually provided at its upper end with a hand lever, not shown, by means of which it can be oscillated. With this arrangement, as is now evident, each time the doors are opened, as shown in Fig. 2, the slide 19 will be moved to dirt-discharging position, as shown in Fig. 5; and each time the doors are closed, said slide will be moved to the port-closing position shown in Fig. 4. Obviously, when the doors are closed and the slide 19 is positioned, as shown in Fig. 4, all passage of air from the outside into the interior of the closed vehicle will be cut off. When, however, the doors are opened, the slide will be moved to the position shown in Fig. 5 and will scrape accumulated dirt to the aligned ports or passages 18 and 20, thereby insuring discharge of dirt which may have fallen into the dust box or receptacle.

Inasmuch as two grill treads are shown in the particular application illustrated, I provide an inclined bottom plate 31 which underlies the upper tread 16 and delivers dirt that passes through the tread 16 downward into the receptacle 17.

From the foregoing it will be understood that various alterations in the details of construction and arrangement of parts may be made within the scope of my invention herein disclosed and claimed. It has already been stated that doors of various kinds may be employed and that the door-actuating mechanism may vary materially. The important thing being that when the doors are closed, outside air will be cut off from the enclosed part of the vehicle and that when the doors are opened, the dirt-discharging action will take place. The slide 19 operates both as a device for cutting off air passages through the treads while the door is closed and for discharging the dirt when or during the time that the doors are open.

In this specification the term "dirt" is used in a broad sense to include any of the foreign materials such as snow, mud, or other materials, that adhere to a passenger's shoes and which can be scraped therefrom and will fall through the grates that form the treads of the steps. In the preferred arrangement illustrated, there are several compartments underlying each tread and each of these compartments is preferably provided with a slanting baffle board 31a and under which the solid portions of the slide 19 move when the door is open and the slide is in discharging position, shown in Fig. 5.

What I claim is:

1. The combination with an enclosed vehicle having a perforate step tread and a dirt receptacle below said tread, of a dirt ejector working at the bottom of said dirt receptacle, and connections for simultaneously opening said door and actuating said dirt ejector.

2. The combination with an enclosed vehicle having a door, of a perforate step tread inside of said door, a dirt receptacle below said tread, the bottom of the latter having dirt discharge passages, an ejecting slide working over the bottom of said dirt receptacle and having passages adapted to register with the dirt discharge passages in the bottom of said dirt receptacle, a door operating mechanism for opening and closing the same, and a connection between said door-actuating mechanism and slide arranged to set said slide out of registration with the dirt discharge passages in the bottom of said receptacle, when the door is closed, and to bring the passages of said slide into registration with the dirt passages in the bottom of said receptacle, when said door is in an open position.

3. The combination with an enclosed vehicle body having a door and a perforated step tread at the inner side of the door, of a dirt receptacle below said tread, the latter having a perforate bottom, of a perforate ejecting slide working over the perforate bottom of said receptacle, a door operating mechanism for opening and closing said door, and a connection between said door-actuating mechanism and slide constructed and arranged to move said slide to dirt-discharging position when the door is open and to move said slide to close the bottom of said receptacle when the door is moved to closed position.

4. The structure defined in claim 3 in which the connection between the door-actuating mechanism and said slide is adjustable to vary the extent of movement of said slide under door opening and closing movements.

5. The structure defined in claim 1 in which said vehicle has at least two step treads, the one being above and inward of said first noted tread, and an inclined deflecting plate located below the said inner step and extended down to said first noted dirt receptacle for the delivery of dirt thereto.

6. The structure defined in claim 2 in which said vehicle has at least two step treads, the one being above and inward of said first noted tread, and an inclined deflecting plate located below the said inner step and extended down to said first noted dirt receptacle for the delivery of dirt thereto.

7. The structure defined in claim 3 in which said vehicle has at least two step treads, the one being above and inward of said first noted tread, and an inclined deflecting plate located below the said inner step and extended down to said first noted dirt receptacle for the delivery of dirt thereto.

HENRY GAU.